United States Patent [19]
Gutmann et al.

[11] 3,966,846

[45] June 29, 1976

[54] PROCESS FOR THE PREPARATION OF TRANSPARENT HIGH IMPACT STRENGTH VINYL CHLORIDE POLYMERS

[75] Inventors: Walter Gutmann, Zurich; Rene Nicolet, Fribourg, both of Switzerland

[73] Assignee: Lonza Ltd., Gampel, Valais, Switzerland

[22] Filed: Dec. 9, 1974

[21] Appl. No.: 530,554

[30] Foreign Application Priority Data
Dec. 7, 1973  Switzerland.................... 017183/73

[52] U.S. Cl. .......................... 260/884; 260/23 AR; 260/23 XA; 260/235; 260/878 R; 260/885; 260/886
[51] Int. Cl.² ................ C08L 27/06; C08L 23/08; C08L 31/02; C08L 25/14
[58] Field of Search................... 260/884, 885, 886

[56] References Cited
UNITED STATES PATENTS

| | | | |
|---|---|---|---|
| 3,334,156 | 8/1967 | Calentine et al.................... | 260/884 |
| 3,763,279 | 10/1973 | Kelly.................................. | 260/884 |
| 3,776,982 | 12/1973 | Nicolet et al. ..................... | 260/884 |
| 3,832,318 | 8/1974 | Gallagher et al. ................. | 260/884 |
| 3,843,753 | 10/1974 | Owens............................... | 260/876 R |
| 3,851,016 | 11/1974 | Nicolet et al. ..................... | 260/884 |
| 3,853,968 | 12/1974 | Bortnick et al.................... | 260/876 R |

*Primary Examiner*—Murray Tillman
*Assistant Examiner*—Thurman K. Page
*Attorney, Agent, or Firm*—Christen & Sabol

[57] ABSTRACT

Process for the preparation of a transparent, high-impact-strength and weather-resistant vinyl chloride polymer by the polymerization of vinyl chloride either together with or without other copolymerizable monomers in aqueous dispersion by the emulsion polymerization method in the presence of at least one acrylic ester copolymer. The process involves emulsion polymerizing vinyl chloride or a monomer mixture containing at least 80 percent by weight of vinyl chloride in the presence of a dispersion of at least one acrylic ester copolymer consisting of 55 to 94.7 percent by weight of at least one acrylic ester containing 3 to 18 carbon atoms in the ester group, 35 to 5 percent by weight of α-methyl styrene and 0.3 to 10 percent by weight of a polyfunctional monomer having at least two non-conjugated ethylenic double bonds, at least one of said double bonds being of the allyl type. The acrylic ester copolymer having a mean particle diameter of 30 to 150 nm, determined by soap titration. The acrylic ester copolymer is used in a quantity such that the resultant vinyl polymer contains 4 to 20 percent by weight of acrylic ester units.

21 Claims, 3 Drawing Figures

□ EHA/MS/AMA = 10/3/0.1
○ EHA/MS = 10/3

□ EHA/MS/AMA = 10/3/0.1
△ EHA/MS/AMA = 10/3/0.25
▲ EHA/MS/AMA = 10/3/0.375
○ EHA/MS = 10/3

PROCESS FOR THE PREPARATION OF TRANSPARENT HIGH IMPACT STRENGTH VINYL CHLORIDE POLYMERS

BACKGROUND OF THIS INVENTION

1. Field of this Invention

This invention relates to a process for the preparation of transparent high impact strength and weather-resistant vinyl chloride polymers by the polymerization of vinyl chloride either together with or without other copolymerizable monomers in aqueous dispersion by the emulsion polymerization method in the presence of acrylic ester copolymers.

2. Prior Art

Belgian Patent No. 770,011 discloses producing vinyl chloride polymers by the polymerization of vinyl chloride by the emulsion polymerization method in the presence of 2 to 10 percent by weight of a 2-ethyl hexyl acrylate polymer. In comparison with the products produced by previous prior art, these prior art products have increased impact strength and better transparency. These prior art products are suitable for the production of translucent products, but they have too much haze (as defined hereinafter) for use for transparent applications. If higher transparency is required, the concentration of the 2-ethyl hexyl acrylate prepolymer can be reduced or the diameter of the poly-2-ethyl hexyl acrylate particles can be reduced. Both these steps, however, reduce the impact strength.

BROAD DESCRIPTION OF THIS INVENTION

An object of this invention is to provide a process for the production of vinyl chloride polymers which have high impact strength, have good resistance to climatic conditions and are transparent or substantially transparent.

Other objects and advantages will be obvious to one ordinarily skilled in the art.

The objects and advantages of this invention are achieved by the process and product of this invention.

It has now been found that transparent to substantially transparent polymers of vinyl chloride, which also have high impact strength and good resistance to climatic conditions, are obtained if the pre-polymer used is a copolymer of acrylic ester with α-methyl styrene and a polyfunctional monomer having at least two non-conjugated ethylenic double bonds, at least one of the double bonds being of the allyl type.

The process according to this invention is characterized in that vinyl chloride or monomer mixture containing at least 80 percent by weight of vinyl chloride are polymerized in the presence of a dispersion of at least one (acrylic ester) copolymer consisting of 55 to 94.7 percent by weight of at least one acrylic ester containing 3 to 18 carbon atoms in the ester group, 35 to 5 percent by weight of α-methyl styrene and 0.3 to 10 percent by weight of a polyfunctional monomer having at least two non-conjugated ethylenic double bonds, at least one of such double bonds being of the allyl type. The acrylic ester copolymer has a mean particle diameter of 30 to 150 nm, preferably 40 to 120 nm, determined by soap titration. The acrylic ester copolymer is used in a quantity such that the end polymer contains 4 to 20 percent by weight of acrylic ester units.

The acrylic ester copolymers preferably consist of 65 to 84.5 percent by weight of at least one acrylic ester having 3 to 18 carbon atoms, advantageously 4 to 8 carbon atoms, in the ester group, 30 to 15 percent by weight of α-methyl styrene and 0.5 to 5 percent by weight of a polyfunctional monomer having at least two non-conjugated ethylenic double bonds, at least one of such double bonds being allyl or of the allyl type.

This invention also includes the product defined herein.

DETAILED DESCRIPTION OF THIS INVENTION

Figure 1:
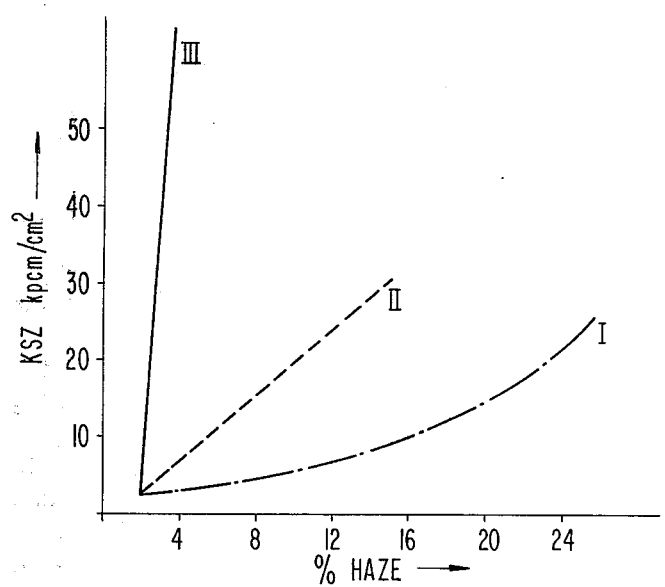

The acrylic ester component in the acrylic ester copolymer contains one acrylic ester or a plurality of different acrylic esters (e.g., two to four different acrylic esters). Examples of useful acrylic esters for forming the acrylic ester copolymer are propyl acrylate, isopropyl acrylate, butyl acrylate, isobutyl acrylate, hexyl acrylate, 2-ethyl hexyl acrylate, lauryl acrylate, myristyl acrylate, stearyl acrylate (and mixtures thereof). Acrylic ester copolymers containing at least 90 percent by weight of 2-ethyl hexyl acrylate as acrylic ester component are preferably used.

The following compounds are examples of useful polyfunctional monomers having at least one allyl or allyl type double bond (which are used in the acrylic ester copolymers); monoallyl and methallyl esters of unsaturated mono or polycarboxylic acids, such as, allyl acrylate, allyl methacrylate, allyl crotonate, allyl cinnamate, methallyl acrylate, methallyl methacrylate, monoallyl maleate and monallyl fumarate; di-, tri- and tetra-allyl and methallyl esters of saturated or unsaturated polycarboxylic acids, of cyanuric acid and of phosphoric acid, such as, diallyl and dimethallyl oxalate, diallyl glutarate, diallyl adipate, diallyl phthalate, diallyl terephthalate, tetra-allyl pyromellithate, diallyl maleate, dimethallyl maleate, diallyl fumarate, diallyl isocyanurate, triallyl cyanurate and triallyl phosphate; and di- or polyallyl ethers of polyhydric alcohols and polyallyl acetals, such as, trimethylol propane diallyl ester, trimethylol propane diallyl ether monomethacrylate and tetra-allyl oxyethane.

The polyfunctional allyl monomers can be present initially, or can be added batch-wise or continuously during the reaction, for example, in the form of a mixture with the acrylic acid ester or acrylic acid esters and the α-methyl styrene. In another embodiment, the polyfunctional allyl monomers can be introduced after there has been an acrylic ester reaction of at least 60 percent and preferably of 80 percent.

The amount of acrylic ester copolymer(s) used is such that there are 4 to 20 percent by weight, preferably 5 to 10 percent by weight, of acrylic ester units in the end product (resultant vinyl chloride polymer). The quantity of acrylic ester copolymer used, within the limits according to this invention, depends on the nature of the acrylic ester, the polymerization temperature, the particle size of the acrylic ester copolymer, and the required properties of the end product. The transparency of the end product remains high throughout the range (according to this invention) of acrylic ester copolymer used. Generally, the end products having a low acrylic ester copolymer content have a moderate impact strength, high softening temperature and high stiffness. If the acrylic ester copolymer content is increased, the impact strength generally increases and the stiffness decreases. One ordinarily skilled in the art will readily be able to select the combination of properties suitable for a particular application with a minimum of experiment.

The following applies to the production of the starting acrylic ester copolymers.

The acrylic ester copolymers used for the process according to this invention are employed in the form of aqueous dispersions. They can be produced by emulsion polymerization of the feed monomers in the presence of water-soluble initiators and emulsifiers. The mean particle diameter of the acrylic ester copolymers forming (formed) is determined in the manner known per se by the emulsion polymerization conditions.

Acrylic ester copolymer dispersions of different mean particle diameters may be prepared, for example, by varying the amount of emulsifier used. The emulsifiers are primarily salts of fatty acids having a chain length of from 12 to 18 carbon atoms. Preferably, the alkali or ammonium salts of lauric acid, myristic acid, oleic acid, coconut oil acid, palmitic acid, stearic acid, etc., are used. These emulsifiers are advantageously used in quantities of from 2 to 12 percent by weight based on the monomeric acrylate.

The way in which the monomers and/or emulsifier is added provides another way of influencing the acrylic ester copolymer particle diameter. It is well known that, for example, coarse dispersions are obtained if only some of the total quantity of emulsifier is initially present, with the remainder being added during the reaction.

When acrylic ester copolymer dispersions with relatively coarse mean particle diameters are required, the copolymerization can be carried out in the presence of a pre-formed latex of an acrylic ester homopolymer or copolymer. In such case the polymerization conditions are so selected that only the initially present polymer particles continue to grow without new particles forming.

The mean particle diameter can be determined by different methods in principle, for example, light scatter measurements, by means of a disc centrifuge or by electron microscopy. The latter case entails the risk that the polymer particles will change so intensively during the production of the samples and/or measurements, due to agglomeration or fusion as a result of their low softening temperature, that reliable determination is no longer possible.

Soap titration has proved particularly suitable because of its simplicity. This method is well known and has been used by numerous authors (e.g., Houben-Weyl XIV/1, Page 369). It is based on determining the specific particle area of the dispersion under examination. If $d$ denotes the mean particle diameter in nm and E denotes the amount of emulsifier requied in $q$ in order to cover 1 gm. of polymer with a monomolecular emulsifier coating, and if the density of the polyacrylate or acrylic ester copolymer is taken as 1.00, then according to Jacobi, Angew. Chemie 64, 539–543 (1952) the equation:

$$d = (9.4/E)$$

applies to titration with Mersolat K 30.

The following applies to the production of the vinyl chloride polymer.

The polymerization of the vinyl chloride, either together with or without other copolymerizable monomers, is carried out in aqueous emulsion preferably at temperatures of from 50° to 70°C. The copolymerizable monomers that can be used in addition to vinyl chloride are, in particular: α-olefins, for example, ethylene propylene and 1-butylene; unsaturated carboxylic esters, mainly vinyl esters, such as, vinyl acetate, vinyl propionate, vinyl laurate, vinyl stearate, etc., esters having 1 to 18 carbon atoms in the alkyl group, and maleic or fumaric diesters having 1 to 12 carbon atoms in the alkyl group; and unsaturated ethers, such as, alkyl vinyl ethers, for example, methyl, ethyl, butyl, isobutyl, lauryl, cetyl and stearyl vinyl ether, isopropenyl methyl ether and isopropenyl ethyl ether. The α-olefins and the unsaturated carboxylic esters are preferably used in quantities of from 3 to 20 percent by weight, while the unsaturated ethers are preferably used in quantities of from 1 to 15 percent by weight.

The emulsifiers used will primarily be anion-active emulsifiers, for example, carboxylic acid salts, alkyl sulphates and alkyl or alkyl aryl sulphonates. Preferably, salts of fatty acids are used with a chain length of 12 to 18 carbon atoms, primarily the alkali or ammonium salts of lauric acid, myristic acid, oleic acid, coconut oil acid, palmitic acid, stearic acid, etc. These emulsifiers are advantageously used in quantities of from 0.05 to 1 percent based on the monomers.

The catalysts used are water-soluble radical formers, such as peroxides, persulphates, azo-compounds and redox compounds. The quantity is advantageously 0.05 to 0.5 percent by weight based on the monomers.

Polymerization can be carried out in the presence of polymerization controllers, such as, mercaptans and saturated or unsaturated halogen hydrocarbons. The amount of polymerization controller used depends upon its type and the required K-value. For example, dodecyl mercaptan is used in quantities of from 0.01 to 0.2 percent by weight based on the vinyl chloride. Trichloroethylene, 1,2-dichloroethylene or bromoform are used in quantities of from 0.1 to 5 percent. Preferably, the K-value of the vinyl chloride polymers obtained should be about 60 to 75.

The polymerization is carried out using a pressure vessel which allows thorough mixing, for example, a pressure vessel equipped with an agitator, the aqueous dispersion of the acrylic ester copolymer together with the catalyst, emulsifier and any polymerization controller being placed in the pressure vessel, the monomeric vinyl chloride being added, either with or without other copolymerizable monomers, and being polymerized at the given reaction temperature.

The process according to this invention can be carried out with a working pressure of 65 to 99 percent, preferably 75 to 99 percent, of the saturation pressure of the vinyl chloride or of the monomer mixture at the appropriate polymerization temperature. The monomeric vinyl chloride is partly dissolved in the aqueous phase and partly absorbed in the polymer that has already formed and is finally in the gaseous state; however, it is never present in the liquid state in the reaction chamber.

The working pressure can be maintained by continuous or substantially continuous supply of vinyl chloride as it is consumed by the polymerization process.

This replenishment of vinyl chloride may, for example, be effected by connecting the polymerization vessel gas chamber to the gas chamber of a reservoir in which monomeric vinyl chloride — if necessary after the addition of a non-volatile polymerization inhibitor — is kept at a temperature such that the resulting pressure is just sufficient to equalize the specified working pressure in the reaction chamber. The vinyl chloride may alternatively be continuously pumped in liquid form; in a preferred embodiment of this invention, liquid vinyl chloride is introduced into batches so small that the pressure in the reaction chamber remains substantially constant, i.e., fluctuates in practice by less than 0.2 atmospheres about the specified value. As a result of the vacuum in the reaction chamber the liquid vinyl chloride added is immediately vaporized on arrival in the reaction chamber so that no vinyl chloride in liquid form can reach the polymerization centers.

The monomers copolymerizable with the vinyl chloride can be added either in the form of a mixture with the vinyl chloride or separately, in which latter case they may be initially present completely or else just partially and the remainder added continuously or intermittently during the polymerization process.

After polymerization is complete, the polymer is processed in a known manner, for example, by coagulation, with the addition of electrolytes, and separation from the polymerization serum by centrifuging, washing and drying in a rotary dryer, or by a spray drying or spraying on a drum dryer.

The polyvinyl chloride products obtained according to this invention owe their superior properties to the simultaneous use of one or more acrylic esters, α-methyl styrene and a polyfunctional allyl monomer as defined above, as constituents of the acrylic ester copolymer. Without exception they have a much better transparency and a higher impact strength than the corresponding products produced by the prior-art processes involving polymerization of the vinyl chloride in the presence of acrylic ester polymers without α-methyl styrene and polyfunctional allyl monomer as further components. Even in comparison with polyvinyl chloride products produced using acrylic ester compolymers consisting of (a) one or more acrylic esters and α-methyl styrene, but without polyfunctional allyl monomer, or (b) one or more acrylic esters and a polyfunctional allyl monomer but without α-methyl styrene, the products obtained according to this invention have greater transparency together with higher impact strength.

Figure 2:
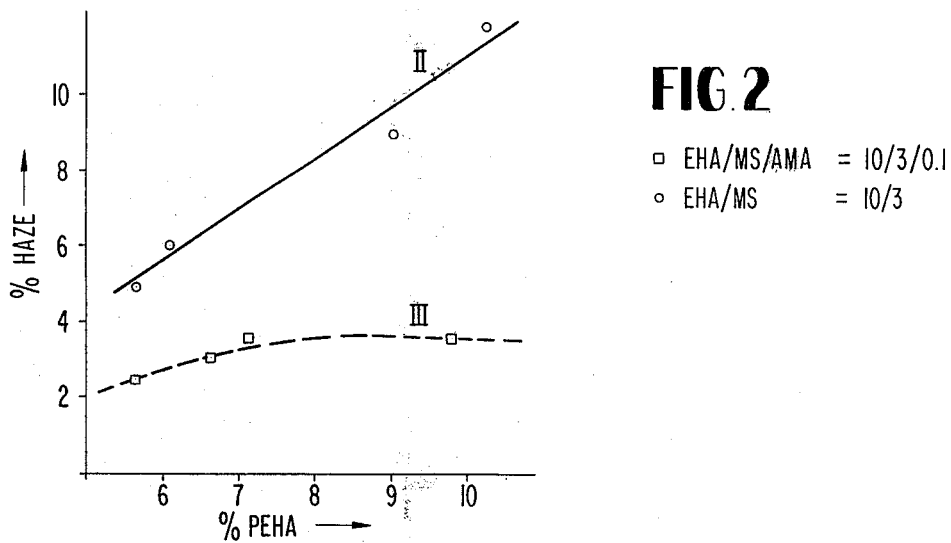
Figure 3:
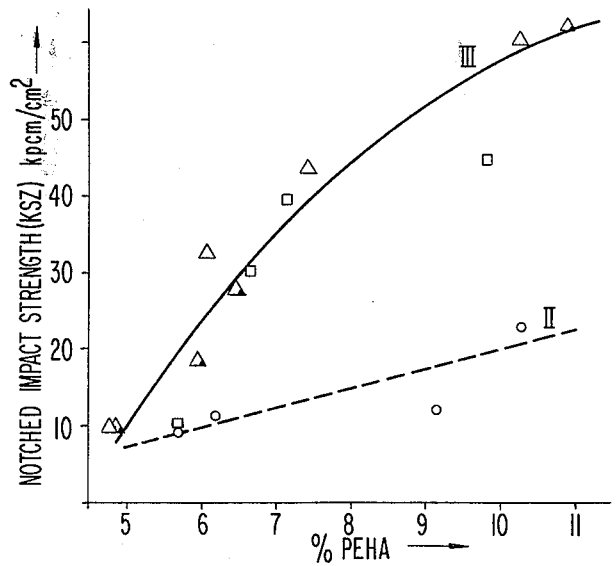

This is shown by the curves in FIGS. 1 to 3. (In FIG. 1, curve I uses poly-2-ethyl hexyl acrylate as the prepolymer, curve II uses a copolymer of 2-ethyl hexyl acrylate and α-methylstyrene as the prepolymer, and curve III uses a copolymer of 2-ethyl hexyl acrylate, α-methylstyrene and polyfunctional allyl compound as the prepolymer. In FIGS. 2 and 3, EHA represents 2-ethyl hexyl acrylate, MS represents α-methyl styrene and AMA represents allyl methacrylate. In FIGS. 2 and 3, % PEHA means the percentage of 2-ethyl hexyl acrylate in the final vinyl chloride polymer.

FIG. 1 shows the notched impact strength (KSZ) in kpcm/cm$^2$ against the haze of 1 mm pressed sheets in percent. Curve I corresponds to vinyl chloride polymers produced in the presence of 3 to 10 percent by weight of poly-2-ethyl hexyl acrylate with different particle sizes of between approximately 25 nm and approximately 140 nm. Curve II shows vinyl chloride polymers produced in the presence of acrylic ester copolymers consisting of one or more acrylic esters and α-methyl styrene having mean particles sizes from approximately 25 nm to approximately 140 nm. The vinyl chloride polymers obtained according to this invention are shown in curve III. In comparison with the products of curves I and II, the haze of the products of this invention is either reduced by about 50 to 90 percent percent given the same notched impact strength (along horizontal straight lines) or else the notched impact strengths are as much as from 4 to 20 times given the same haze (along vertical straight lines).

FIG. 2 shows the haze of 1 mm sheets in percent while FIG. 3 shows the notched impact strength in kpcm/cm$^2$, both as a function of the percentage of polyacrylic ester contained in the end product. The curves II correspond in each case to vinyl chloride polymers which were placed in the presence of copolymers of acrylic ester and α-methyl styrene with mean particle diameters from approximately 25 nm to approximately 140 nm. The vinyl chloride polymers obtained according to this invention are shown in curves III. For the same polyacrylic ester content, the products of this invention have much less haze and superior notched impact strength over the entire range. Since the stiffness depends primarily on the acrylic ester polymer content and decreases as the latter increases, the vinyl chloride polymers obtained according to this invention enable higher impact strength to be obtained with identical stiffness, or higher stiffness with identical impact strength.

In addition, the white-spot effect does not occur on breakage of the products according to this invention. This effect is characteristic of a panel or sheet made from a vinyl chloride polymer obtained by the conventional processes in the presence of an acrylic ester polymer, when subjected to mechanical stress such as bending or pulling, permanent damage occurring at those places which were subjected to stress and having a disturbing appearance in the form of white spots. Sheets of the material according to this invention can be bent to and fro repeatedly, for example, through 180°, without any white spots occurring.

If the polyfunctional monomers having at least two non-conjugated ethylenic double bonds, at least one of which is of the allyl type, are replaced by polyfunctional monomers which do not have a double bond of the allyl type, for example, ethylene glycol dimethacrylate or 1,3-butylene glycol dimethacrylate, the required impact strength, transparency and white spot effect achieved with the process according to this invention is not attained.

As a result of their excellent impact strength, transparency and resistance to climatic conditions, the vinyl chloride polymers according to this invention can be utilized in the manufacture of transparent or translucent products, such as, panels, pipes or tubes, sections, etc, by extrusion, injection molding, calendering, etc, and provide valuable building materials.

In this application, all parts, percentages, ratios and proportions are on a weight basis.

EXAMPLE 1

Preparation of acrylic ester copolymers (pre-dispersion)

Desalinated water, lauric acid (LS), caustic soda solution and potassium peroxide disulphate (KPS) in quantities as indicated in Table 1 were heated to the polymerization temperature of 70°C. with agitation in a 12 liter stainless steel agitator. After repeated evacuation and admission of nitrogen under pressure to flush the agitator, nitrogen was finally introduced under a pressure of 2 atmospheres gauge. After the polymerization temperature had been reached, 100 gm. of monomer mixture (pre-dispersions A to V) were pumped in for 2 minutes. The remaining monomer was pumped in over a period of 2 hours after 10 minutes. After a total reaction time of 4 hours the pressure was reduced and the vessel cooled. The mean particle diameter was determined by soap titration with emulsifier K 30 (Bayer).

The following examples illustrate the production of vinyl chloride polymers in the presence of dispersion of copolymers according to Table 1.

EXAMPLE 2

Preparation of vinyl chloride polymers

Desalinated water, lauric acid, caustic soda solution and potassium peroxide disulphate in quantities as indicated in Table 2 were placed in a 12 liter agitator autoclave and heated to the polymerization temperature of 59°C. The appropriate dispersion of the copolymer (pre-dispersion) was introduced during the heating-up period (quantity as shown in Table 2). The autoclave was then evacuated and flushed by repeated admission of vinyl chloride under pressure followed by expansion. After the polymerization temperature had been reached, the indicated quantity of vinyl chloride was admitted under pressure. The reaction was allowed to progress with agitation to a pressure of 4 atmospheres gauge, and then the pressure was reduced and the vessel cooled. The dispersion contained 23 to 25 percent by weight of solids. The polymer was isolated conventionally by coagulation with electrolytes.

For comparison purposes, vinyl chloride was polymerized in the presence of dispersion of ethyl hexyl acrylate homopolymer (Experiments Nos. 40, 41 and 42), in the presence of dispersions of ethyl hexyl acrylate α-methyl styrene copolymers (Experiments Nos. 1, 2, 3 and 4) and without the dispersion of acrylic ester polymers (Experiment No. 39).

Mixtures consisting of 60.5 parts by weight of vinyl chloride polymer, 1 part by weight of organic thiostannic stabilizer and 1 part by weight of lubricant were rolled for 10 minutes at 180°C. on mixing rolls and pressed at 180°C. to yield 1 mm and 4 mm thick sheets. The notched impact strength of small standard sticks was measured in accordance with DIN 53453 and the Vicat softening points was measured in accordance with DIN 53460. The haze was measured by means of a Haze-meter by Messrs. Evans Electroselenium Ltd. of Halstead (England), by the method of ASTM D 1003-61. Haze is defined as the ratio of the light Td scattered on passing through the sample, to the total transmitted light Tt. The measurement is given as a percentage:

$$\text{Haze} = \frac{Td}{Tt} \cdot 100\ (\%)$$

To test processing properties, a mixture of 28.5 parts by weight of vinyl chloride polymer, 1.15 parts by weight of barium cadmium stabilizer and 0.35 parts by weight of lubricant were kneaded in a type W 30 H measuring kneader of a type Pl 3 S plastograph made by Messrs. Brabender, of Duisburg (Germany), at 180°C and 40 rpm. The lowest torque reached in kpm after gelling was taken as the indication of the processing properties, said torque depending upon the melt viscosity of the material.

The results obtained are shown in Tables 2(a) and 2(b).

TABLE 1

| Pre-dispersion | water gm | LS gm | NaOH 10n ml | KPS gm | EHA gm | MS gm | Polyfunctional monomer | | Temperature °C | Mean particle diameter nm | Composition of copolymer | | |
|---|---|---|---|---|---|---|---|---|---|---|---|---|---|
| | | | | | | | | gm | | | EHA % | MS % | Polyfunctional monomer % |
| A | 5650 | 30 | 15 | 5 | 1000 | 300 | — | | 70 | 60 | 76.9 | 23.1 | |
| B | 5650 | 30 | 15 | 5 | 1000 | 300 | AMA | 5 | 70 | 66 | 76.6 | 23.0 | 0.4 |
| C | 5640 | 30 | 15 | 5 | 1000 | 300 | AMA | 10 | 70 | 58 | 76.3 | 22.9 | 0.8 |
| D | 5625 | 30 | 15 | 5 | 1000 | 300 | AMA | 25 | 70 | 60 | 75.5 | 22.6 | 1.9 |
| E | 5610 | 30 | 15 | 5 | 1000 | 300 | AMA | 37,5 | 70 | 56 | 74.8 | 22.4 | 2.8 |
| F | 5585 | 30 | 15 | 5 | 1000 | 300 | AMA | 65 | 70 | 58 | 73.3 | 22.0 | 4.8 |
| G | 5925 | 30 | 15 | 5 | 1000 | | AMA | 25 | 70 | 55 | 97.6 | — | 2.4 |
| H | 5425 | 30 | 15 | 5 | 1000 | 500 | AMA | 25 | 70 | 65 | 65.6 | 32.8 | 1.6 |
| J | 5440 | 30 | 15 | 5 | 1000 | 500 | AMA | 10 | 70 | 69 | 66.2 | 33.1 | 0.7 |
| K | 5625 | 30 | 15 | 5 | 1000 | 300 | DAP | 25 | 70 | 72 | 75.5 | 22.6 | 1.9 |
| L | 5625 | 30 | 15 | 5 | 1000 | 300 | DAM | 25 | 70 | 56 | 75.5 | 22.6 | 1.9 |
| M | 5625 | 30 | 15 | 5 | 1000 | 300 | DAF | 25 | 70 | 57 | 75.5 | 22.6 | 1.9 |
| N | 5425 | 30 | 15 | 5 | 1000 | 500 | TAC | 25 | 70 | 65 | 65.6 | 32.8 | 1.6 |
| O | 5425 | 30 | 15 | 5 | 1000 | 500 | TAE | 25 | 70 | 74 | 65.6 | 32.8 | 1.6 |
| P | 5625 | 30 | 15 | 5 | 1000 | 300 | AGDM | 25 | 70 | 68 | 75.5 | 22.6 | 1.9 |
| Q | 5000 | 25 | 12,5 | 5 | 1000 | 300 | AGDM | 65 | 70 | 81 | 73.3 | 22.0 | 4.8 |
| R | 5640 | 30 | 15 | 5 | 1000 | 300 | BGDM | 13 | 70 | 80 | 76.2 | 22.8 | 1.0 |
| S | 5635 | 24 | 12 | 5 | 1000 | 300 | AMA | 25 | 70 | 108 | 75.5 | 22.6 | 1.9 |
| T | 5640 | 22 | 11 | 5 | 1000 | 300 | AMA | 25 | 70 | 124 | 75.5 | 22.6 | 1.9 |
| U | 5660 | 22 | 11 | 5 | 1000 | 300 | — | | 70 | 120 | 76.9 | 23.1 | — |
| V | 5950 | 30 | 15 | 5 | 1000 | | | | 70 | 60 | 100.0 | | |

LS = Lauric acid
KPS = Potassium peroxide disulphate
EHA = 2-ethyl hexyl acrylate
MS = α-methyl styrene
AMA = allyl methacrylate
DAP = diallyl phthallate
DAM = diallyl maleate
DAF = diallyl fumarate
TAC = triallyl cyanurate
TAE = tetra-allyl oxyethane
AGDM = ethylene glycol dimethacrylate
ABDM = 1,3-butylene glycol dimethacrylate

TABLE 2(a)

| Experiment No. | Pre-dispersion No. | Pre-dispersion particle diameter nm | g | water g | LS g | NaOH In ml | KPS g | VC g | temperature °C |
|---|---|---|---|---|---|---|---|---|---|
| 1 | A | 60 | 560 | 5480 | 10 | 60 | 2 | 1900 | 59 |
| 2 | A | 60 | 700 | 5380 | 9 | 50 | 2 | 1870 | 59 |
| 3 | A | 60 | 910 | 5210 | 8 | 45 | 2 | 1830 | 59 |
| 4 | A | 60 | 1190 | 5000 | 7 | 40 | 2 | 1780 | 59 |
| 5 | B | 66 | 910 | 5210 | 8 | 45 | 2 | 1830 | 59 |
| 6 | C | 58 | 910 | 5210 | 8 | 50 | 2 | 1830 | 59 |
| 7 | D | 60 | 910 | 5210 | 8 | 45 | 2 | 1830 | 59 |
| 8 | E | 56 | 910 | 5300 | 8 | 50 | 2 | 1830 | 59 |
| 9 | F | 58 | 910 | 5220 | 8 | 50 | 2 | 1830 | 59 |
| 10 | D | 60 | 560 | 5490 | 10 | 60 | 2 | 1900 | 59 |
| 11 | D | 60 | 910 | 5390 | 9 | 50 | 2 | 1870 | 59 |
| 12 | D | 60 | 1190 | 5000 | 7 | 40 | 2 | 1780 | 59 |
| 39 | — | — | — | 5940 | 12 | 60 | 2 | 2000 | 59 |
| 40 | V | 60 | 560 | 5470 | 9 | 50 | 2 | 1900 | 59 |
| 41 | V | 60 | 700 | 5450 | 9 | 50 | 2 | 1900 | 59 |
| 42 | V | 60 | 910 | 5170 | 8 | 45 | 2 | 1870 | 59 |

LS = Lauric acid
KPS = Potassium peroxide disulphate

TABLE 2(b)

| Experiment No. | Content in % of EHA | MS | AMA | HAZE in % sheet 1mm | sheet 4mm | Brabender torque mkp | Notched impact strength kpcm/cm² | Vicat °C |
|---|---|---|---|---|---|---|---|---|
| 1 | 5.7 | 1.7 | | 5 | 14 | 1.5 | 8.9 | 76 |
| 2 | 6.2 | 1.9 | | 6 | 14 | 1.6 | 11.2 | 75 |
| 3 | 9.2 | 2.8 | | 9 | 25 | 1.5 | 12.5 | 76 |
| 4 | 10.3 | 3.1 | | 12 | 31 | 1.4 | 23.4 | 75 |
| 5 | 7.9 | 2.4 | 0.04 | 3.5 | 11 | 1.6 | 23.2 | 76 |
| 6 | 7.2 | 2.2 | 0.07 | 3.5 | 10 | 1.6 | 40.3 | 76 |
| 7 | 7.5 | 2.2 | 0.19 | 3.0 | 10 | 1.7 | 44.6 | 74 |
| 8 | 6.5 | 2.0 | 0.24 | 3.0 | 14 | 1.75 | 28.7 | 74 |
| 9 | 8.3 | 2.5 | 0.54 | 2.5 | 6 | 1.80 | 47.8 | 74 |
| 10 | 4.8 | 1.4 | 0.12 | 2.5 | 7.5 | 1.6 | 10.0 | 75 |
| 11 | 6.1 | 1.8 | 0.15 | 3.0 | 9.0 | 1.6 | 33.0 | 75 |
| 07 | 7.5 | 2.2 | 0.19 | 3.0 | 10.0 | 1.7 | 44.6 | 74 |
| 12 | 10.3 | 3.1 | 0.26 | 2.5 | 10.5 | 1.8 | 60.9 | 73 |
| 39 | — | — | — | 3.0 | 4.0 | 1.5 | 3.0 | 76 |
| 40 | 5.4 | — | — | 18 | — | — | 10.6 | 75 |
| 41 | 6.6 | — | — | 21 | — | — | 14.2 | 75 |
| 42 | 8.0 | — | — | 40 | — | — | 17.2 | 75 |

EHA = 2-ethyl hexyl acrylate
MS = α-methyl styrene I
AMA = allyl methacrylate

EXAMPLE 3

The experiments of Example 2 were repeated but pre-dispersions according to Example 1 were used with 33 percent of α-methyl styrene instead of 23 percent. By way of comparison, vinyl chloride was polymerized in the presence of a dispersion without α-methyl styrene (Experiments Nos. 13 and 14). The polymerizations formulations and the results are given in Tables 3(a) and 3(b).

EXAMPLE 4

The experiments of Example 2 were repeated, but polymerization was carried out in the presence of pre-dispersion in which the allyl methacrylate was replaced by diallyl phthalate (Experiment No. 22), diallyl maleate (Experiment No. 23) and diallyl fumarate (Experiment No. 24), triallyl cyanurate (Experiment No. 25) and tetra-allyl oxyethane (Experiment No. 26).

For comparison purposes, pre-dispersions were used which contained ethylene glycol dimethacrylate (Experiments Nos. 27 and 28) and 1,3-butylene glycol dimethacrylate (Experiment No. 29) instead of the allyl compounds.

The experimental data and the results are given in Tables 4(a) and 4(b).

EXAMPLE 5

Experiment No. 7 according to this invention in Example 2 was repeated but with a polymerization temperature of 53° and 67°C instead of 59°C.

The polymerization conditions and the results are given in Tables 5(a) and 5(b).

TABLE 3(a)

| Experiment No. | Pre-dispersion No. | Particle diameter nm | gm | Water gm | LS gm | NaOH In ml | KPS gm | VC gm | Temperature °C |
|---|---|---|---|---|---|---|---|---|---|
| 13 | G | 55 | 910 | 5230 | 8 | 45 | 2 | 1870 | 59 |

TABLE 3(a)-continued

| Experiment No. | Pre-dispersion No. | Pre-dispersion Particle diameter nm | Pre-dispersion gm | Water gm | LS gm | NaOH In ml | KPS gm | VC gm | Temperature °C |
|---|---|---|---|---|---|---|---|---|---|
| 14 | G | 55 | 1190 | 4950 | 7 | 40 | 2 | 1830 | 59 |
| 15 | H | 65 | 910 | 5250 | 8 | 45 | 2 | 1800 | 59 |
| 16 | H | 65 | 1190 | 5040 | 7 | 40 | 2 | 1740 | 59 |
| 17 | H | 65 | 1910 | 4500 | 4 | 25 | 2 | 1580 | 59 |
| 18 | J | 69 | 560 | 5500 | 10 | 60 | 2 | 1880 | 59 |
| 19 | J | 69 | 700 | 5400 | 9 | 50 | 2 | 1850 | 59 |
| 20 | J | 69 | 910 | 5240 | 8 | 45 | 2 | 1800 | 59 |
| 21 | J | 69 | 1190 | 5030 | 7 | 40 | 2 | 1740 | 59 |

LS = Lauric acid
KPS = Potassium peroxide disulphate

TABLE 3(b)

| Experiment No. | Content in % of EHA | Content in % of MS | Content in % of AMA | HAZE in % 1mm sheet | HAZE in % 4mm sheet | Brabender torque mkp | Notched impact strength kpcm/cm² | Vicat °C |
|---|---|---|---|---|---|---|---|---|
| 13 | 8.5 | — | 0.21 | 8.0 | 24.0 | 1.6 | 38.7 | 76 |
| 14 | 10.5 | — | 0.26 | 9.0 | 32.0 | 1.6 | 49.1 | 74 |
| 15 | 8.9 | 4.50 | 0.22 | 2.0 | 5.0 | 1.6 | 29.2 | 74 |
| 16 | 10.2 | 5.1 | 0.26 | 2.0 | 5.5 | 1.7 | 27.0 | 74 |
| 17 | 15.5 | 7.8 | 0.39 | 2.0 | 5.0 | 1.8 | 39.0 | 69 |
| 18 | 5.6 | 2.8 | 0.06 | 3.0 | 5.5 | 1.5 | 7.5 | 76 |
| 19 | 5.9 | 3.0 | 0.06 | 2.0 | 6.0 | 1.6 | 15.7 | 76 |
| 20 | 6.8 | 3.4 | 0.07 | 2.0 | 7.0 | 1.7 | 31.5 | 76 |
| 21 | 10.4 | 5.2 | 0.10 | 2.5 | 8.0 | 1.6 | 35.3 | 75 |

EHA = 2-ethyl hexyl acrylate
MS = α-methyl styrene
AMA = allyl methacrylate

TABLE 4(a)

| Experiment No. | Pre-dispersion nm | Pre-dispersion gm | Water gm | LS gm | NaOH In ml | KPS gm | VC gm | Temperature °C |
|---|---|---|---|---|---|---|---|---|
| 22 | K 72 | 910 | 5210 | 8 | 45 | 2 | 1830 | 59 |
| 23 | L 56 | 910 | 5210 | 8 | 45 | 2 | 1830 | 59 |
| 24 | M 57 | 910 | 5210 | 8 | 45 | 2 | 1830 | 59 |
| 25 | N 65 | 910 | 5250 | 8 | 45 | 2 | 1800 | 59 |
| 26 | O 74 | 910 | 5240 | 8 | 45 | 2 | 1800 | 59 |
| 27 | P 68 | 910 | 5210 | 8 | 50 | 2 | 1830 | 59 |
| 28 | Q 81 | 910 | 5210 | 9 | 50 | 2 | 1830 | 59 |
| 29 | R 80 | 700 | 5380 | 9 | 50 | 2 | 1870 | 59 |

LS = Lauric acid
KPS = Potassium peroxide disulphate

TABLE 4(b)

| Experiment No. | EHA | MS | Polyfunctional monomer | | HAZE in % 1mm sheet | HAZE in % 4mm sheet | Brabender Torque mkp | Notched impact strength kpcm/cm² | Vicat °C |
|---|---|---|---|---|---|---|---|---|---|
| 22 | 8.2 | 2.5 | DAP | 0.21 | 3.0 | 10.0 | 1.60 | 27.0 | 75 |
| 23 | 8.2 | 2.5 | DAM | 0.20 | 3.0 | 7.5 | 1.50 | 23.1 | 75 |
| 24 | 8.3 | 2.5 | DAF | 0.21 | 3.5 | 8.0 | 1.70 | 43.2 | 75 |
| 25 | 7.8 | 3.9 | TAC | 0.21 | 2.0 | 8.5 | 1.70 | 22.2 | 77 |
| 26 | 7.9 | 4.0 | TAE | 0.20 | 2.0 | 5.0 | 1.60 | 23.8 | 75 |
| 27 | 7.9 | 2.4 | AGDM | 0.20 | 8.0 | 26 | 1.55 | 24.6 | 76 |
| 28 | 7.9 | 2.4 | AGDM | 0.51 | 25.0 | 56 | 1.70 | 49.7 | 77 |
| 29 | 6.1 | 1.8 | BGDM | 0.08 | 19.0 |  | 1.70 | 25.0 | 76 |

EHA = 2-ethyl hexyl acrylate
MS = α-methyl styrene
DAP = diallyl phthalate
DAM = diallyl maleate
DAF = diallyl fumarate
TAC = triallyl cyanurate
TAE = tetra allyl oxyethane
AGDM = ethylene glycol dimethacrylate
BGDM = 1,3-butylene glycol dimethacrylate

TABLE 5(a)

| Experiment No. | Pre-dispersion No. | Particle diameter nm | gm | Water gm | LS gm | NaOH In ml | KPS gm | VC gm | Temperature °C |
|---|---|---|---|---|---|---|---|---|---|
| 30 | D | 60 | 910 | 5210 | 8 | 45 | 2 | 1830 | 53 |
| 7  | D | 60 | 910 | 5210 | 8 | 45 | 2 | 1830 | 59 |
| 31 | D | 60 | 910 | 5210 | 8 | 45 | 2 | 1830 | 67 |

LS = Lauric acid
KPS = Potassium peroxide disulphate

TABLE 5(b)

| Experiment No. | Content in % of | | | HAZE in % | | Brabender torque mkp | Notched impact strength kpcm/cm² | Vicat °C |
|---|---|---|---|---|---|---|---|---|
|  | EHA | MS | AMA | 1mm sheet | 4mm sheet | | | |
| 30 | 8.7 | 2.6 | 0.22 | 3.5 | 11 | 1.8 | 48.0 | 77 |
| 7  | 7.5 | 2.2 | 0.19 | 3.0 | 10 | 1.7 | 44.6 | 74 |
| 31 | 8.2 | 2.5 | 0.21 | 4.0 | 12 | 1.5 | 41.8 | 75 |

EHA = 2-ethyl hexyl acrylate
MS = α-methyl styrene
AMA = allyl methacrylate

EXAMPLE 6

Experiment No. 7 of Example 2, Experiment No. 20 of Example 3 and Experiments Nos. 23 and 24 of Example 4 were repeated but with the addition of 1 percent by weight of trichloroethylene as a polymerization controller.

The polymerization conditions and the results are given in Tables 6(a) and 6(b).

EXAMPLE 7

Coarse-particle pre-dispersions were produced in accordance with Example 1 (pre-dispersions S and U) were used for polymerization with vinyl chloride in accordance with Example 2.

The polymerization conditions and the results are given in Tables 7(a) and 7(b).

TABLE 6(a)

| Experiment No. | Pre-dispersion No. | Particle diameter nm | gm | Water gm | LS gm | NaOH In ml | KPS gm | VC gm | Tri gm | Temperature °C |
|---|---|---|---|---|---|---|---|---|---|---|
| 24 | M | 57 | 910 | 5210 | 8 | 45 | 2 | 1830 | —  | 59 |
| 32 | M | 57 | 910 | 5210 | 8 | 45 | 2 | 1830 | 20 | 59 |
| 23 | K | 56 | 910 | 5210 | 8 | 45 | 2 | 1830 | —  | 59 |
| 33 | K | 56 | 910 | 5210 | 8 | 45 | 2 | 1830 | 20 | 59 |
| 7  | D | 60 | 910 | 5210 | 8 | 45 | 2 | 1830 | —  | 59 |
| 34 | D | 60 | 910 | 5210 | 8 | 45 | 2 | 1830 | 20 | 59 |
| 20 | J | 69 | 910 | 5240 | 8 | 45 | 2 | 1830 | —  | 59 |
| 35 | J | 69 | 910 | 5240 | 8 | 45 | 2 | 1830 | 20 | 59 |

LS = Lauric acid
KPS = Potassium peroxide disulphate
Tri = Trichloroethylene

TABLE 6(b)

| Experiment No. | Content in % of | | | | Haze in % | | Brabender torque mkp | Notched impact strength kpcm/cm² | Vicat °C |
|---|---|---|---|---|---|---|---|---|---|
|  | EHA | MS | Polyfunctional Monomer | | 1mm sheet | 4 mm sheet | | | |
| 24 | 8.3 | 2.5 | DAF | 0.21 | 3.5 | 8.0  | 1.7  | 43.2 | 75 |
| 32 | 8.3 | 2.5 | DAF | 0.21 | 3.5 | 8.0  | 1.35 | 17.6 | 75 |
| 23 | 8.2 | 2.5 | DAP | 0.20 | 3.0 | 7.5  | 1.5  | 23.1 | 75 |
| 33 | 7.4 | 2.2 | DAP | 0.18 | 3.5 | 11.0 | 1.3  | 9.1  | 75 |
| 7  | 7.5 | 2.2 | AMA | 0.19 | 3.0 | 10.0 | 1.7  | 44.6 | 74 |
| 34 | 8.1 | 2.4 | AMA | 0.20 | 2.5 | 7.0  | 1.4  | 34.7 | 74 |
| 20 | 6.8 | 3.4 | AMA | 0.07 | 2.0 | 7.0  | 1.7  | 31.5 | 76 |
| 35 | 7.6 | 3.8 | AMA | 0.08 | 2.5 | 8.0  | 1.25 | 11.3 | 75 |

EHA = 2-ethyl hexyl acrylate
MS = α-methyl styrene
DAF = diallyl fumarate
DAP = diallyl phthalate
AMA = diallyl methacrylate

TABLE 7(a)

| Experiment No. | Pre-dispersion No. | Particle diameter nm | gm | Water gm | LS gm | NaOH In ml | KPS gm | VC gm | Temperature °C |
|---|---|---|---|---|---|---|---|---|---|
| 03 | A | 60 | 910 | 5210 | 8 | 45 | 2 | 1830 | 59 |
| 7 | D | 60 | 910 | 5210 | 8 | 45 | 2 | 1830 | 59 |
| 36 | S 108 | 910 | 5210 | 8 | 45 | 2 | 1830 | 59 | |
| 37 | T | 120 | 910 | 5210 | 8 | 45 | 2 | 1830 | 59 |
| 38 | U | 124 | 910 | 5210 | 8 | 45 | 2 | 1830 | 59 |

LS = Lauric acid
KPS = Potassium peroxide sulphate

TABLE 7(b)

| Experiment No. | Content in % of EHA | MS | AMA | Haze in % 1mm sheet | 4mm sheet | Brabender torque mkp | Notched impact strength kpcm/cm² | Vicat °C |
|---|---|---|---|---|---|---|---|---|
| 03 | 9.2 | 2.8 | — | 9.0 | 25 | 1.5 | 12.5 | 76 |
| 7 | 7.5 | 2.2 | 0.19 | 3.0 | 10 | 1.7 | 44.6 | 74 |
| 36 | 7.6 | 2.3 | 0.19 | 5 | 18 | 1.7 | 53.2 | 74 |
| 37 | 7.8 | 2.3 | — | 40 | | 1.5 | 28.4 | 75 |
| 38 | 7.2 | 2.2 | 0.18 | | | 1.75 | 46.6 | 74 |

EHA = 2-ethyl hexyl acrylate
MS = α-methyl styrene
AMA = allyl methacrylate

EXAMPLE 8

5210 gm of desalinated water, 8 gm. of lauric acid, 45 ml of normal sodium hydroxide solution, 2 gm. of potassium peroxide disulphate, and 910 gm. of dispersion C of Example 1 were placed in a stainless steel 12 liter capacity agitator autoclave with agitation at 50°C. The autoclave was evacuated and flushed by repeated admission of vinyl chloride under pressure followed by expansion, and then heated to 59°C. At the autoclave temperature of 59°C vinyl chloride was added in a quantity such that the positive pressure was 8 atmospheres. Additional vinyl chloride was pumped in batches of 10 to 20 gm. at substantially constant pressure as the vinyl chloride was consumed. After a total of 1830 gm. of vinyl chloride had been used, the reaction was allowed to progress to about 4 atmospheres, the unreacted vinyl chloride was expanded and cooled. The polymer was conventionally isolated by precipitation with electrolytes.

The following results were found in comparison with the polymer prepared with the same formulation but using pre-dispersion V of a 2-ethyl hexyl acrylate homopolymer:

| | Experiment No. 43 | 46 |
|---|---|---|
| Polymerization pressure, atmospheres | 8.0 | 8.0 |
| Content of 2-ethyl hexyl acrylate, % | 6.4 | 7.2 |
| Content of α-methyl styrene, % | 1.9 | — |
| Content of allyl methacrylate, % | 0.06 | — |
| Haze 1 mm sheet, % | 2.5 | 10 |
| 4 mm sheet, % | 9.0 | 24 |
| Notched impact strength, kpcm/cm² | 10.5 | 13.1 |
| Vicat, % | 74 | 74 |

EXAMPLE 9

Experiment D according to Example 1 was repeated but the 2-ethyl hexyl arylate was replaced by mixtures of various acrylic esters in accordance with Table 8. These pre-dispersions were used in accordance with Example 2 for polymerization with vinyl chloride.

The polymerization conditions and the results are given in Tables 9(a) and 9(b).

In departure from the test method according to Example 2, the Brabender torque was measured in a measuring kneader type 50 with a mixture consisting of 57 parts by weight of vinyl chloride polymer, 2.3 parts by weight of barium cadmium stabilizer and 0.7 parts by weight of lubricant.

TABLE 8

| Pre-dispersion | Water gm | LS gm | NaOR 10n ml | KPS gm | Monomers (g) acrylic ester | MS | AMA | Temperature °C | Mean particle diameter nm | Composition of copolymer acrylic ester | MS | AMA |
|---|---|---|---|---|---|---|---|---|---|---|---|---|
| WA | 5625 | 30 | 15 | 5 | 100 g IPA 900 g EHA | 300 | 25 | 70 | 62 | 8 % IPA 68 % EHA | 23 | 1,9 |
| WB | 5625 | 30 | 15 | 5 | 400 g BA 600 g EHA | 300 | 25 | 70 | 65 | 30 % BA 45 % EHA | 23 | 1,9 |
| WD | 5625 | 30 | 15 | 5 | 450 g IBA 550 g EHA | 300 | 25 | 70 | 62 | 34 % IBA 42 % EHA | 23 | 1,9 |
| WE | 5625 | 30 | 15 | 5 | 150 g IBA 850 g EHA | 300 | 25 | 70 | 66 | 11 % IBA 64 % EHA | 23 | 1,9 |
| WF | 1330 | 7 | 3,5 | 2 | 118 g EHA 57 g LA | 71 | 5,9 | 75 | 48 | 47 % EHA 23 % LA | 28 | 2,3 |
| WG | 1286 | 6,9 | 3,4 | 1.2 | 172 g EHA 10 g TDA | 69 | 5,7 | 70 | 77 | 67 % EHA 4 % TDA | 27 | 2,2 |
| WH | 1286 | 6,9 | 3,4 | 2 | 137 g EHA | 69 | 5,7 | 70 | 45 | 56 % EHA | 28 | 2,3 |

TABLE 8-continued

| Pre-dispersion | Water gm | LS gm | NaOH 10n ml | KPS gm | Monomers (g) acrylic ester | MS | AMA | Temperature °C | Mean particle diameter nm | Composition of copolymer acrylic ester | MS | AMA |
|---|---|---|---|---|---|---|---|---|---|---|---|---|
| | | | | | 34 g TDA | | | | | 14 % TDA | | |

LS = Lauric acid
KPS = Potassium peroxide disulphate
AMA = Allyl methacrylate
BA = butyl acrylate
EHA = 2-ethyl hexyl acrylate
IBA = isobutyl acrylate
IPA = isopropyl acrylate
MS = α-methyl styrene
LA = lauryl acrylate
TDA = tetradecyl acrylate

TABLE 9(a)

| Experiment NO. | Pre-dispersion Particle diameter nm | gm | Water gm | LS gm | NaOH In ml | KPS gm | VC gm | Temperature °C |
|---|---|---|---|---|---|---|---|---|
| 51 | WA | 62 | 700 | 5380 | 9 | 50 | 2 | 1870 | 59 |
| 52 | WA | 62 | 1400 | 4845 | 6 | 35 | 2 | 1800 | 59 |
| 53 | WA | 62 | 1400 | 4845 | 6 | 35 | 2 | 1140 | 59 |
| 54 | WB | 65 | 910 | 5210 | 8 | 45 | 2 | 1830 | 59 |
| 55 | WB | 65 | 1400 | 4845 | 6 | 35 | 2 | 1800 | 59 |
| 56 | WB | 65 | 1400 | 4790 | 5 | 30 | 2 | 1140 | 59 |
| 57 | WD | 62 | 1400 | 4845 | 6 | 35 | 2 | 1800 | 59 |
| 58 | WD | 62 | 1400 | 4845 | 6 | 35 | 2 | 1140 | 59 |
| 59 | WE | 66 | 700 | 5380 | 9 | 50 | 2 | 1870 | 59 |
| 60 | WE | 66 | 1400 | 4845 | 6 | 35 | 2 | 1800 | 59 |
| 61 | WE | 66 | 1400 | 4845 | 6 | 35 | 2 | 1140 | 59 |
| 62 | WF | 48 | 650 | 5410 | 8,5 | 45 | 2 | 1470 | 59 |
| 63 | WF | 48 | 705 | 5370 | 8 | 45 | 2 | 1200 | 59 |
| 64 | WG | 77 | 630 | 5380 | 8,5 | 47,5 | 2 | 1680 | 59 |
| 65 | WG | 77 | 675 | 5400 | 9 | 50 | 2 | 1360 | 59 |
| 66 | WH | 45 | 675 | 5400 | 9 | 45 | 2 | 1360 | 59 |

LS = Lauric acid
KPS = Potassium peroxide disulphate

TABLE 9(b)

| Experiment No. | Content in % of Acrylates | MS | AMA | Haze in % 1 mm sheet | 4 mm sheet | Brabender torque mkp | Notched impact strength kpcm/c-m$^2$ | Vicat °C |
|---|---|---|---|---|---|---|---|---|
| 51 | 6,6 | 2,0 | 0,17 | 2,4 | 8,9 | 2,6 | 13,4 | 76 |
| 52 | 11,5 | 3,5 | 0,29 | 2,4 | 7,7 | 3,0 | 44,5 | 74 |
| 53 | 19,6 | 5,9 | 0,49 | 3,4 | 9,2 | 3,15 | 37,1 | 71 |
| 54 | 6,0 | 1,8 | 0,15 | 1,8 | 7,3 | 2,65 | 11,9 | 75 |
| 55 | 11,2 | 3,4 | 0,28 | 2,8 | 7,7 | 2,7 | 50,3 | 73 |
| 56 | 16,5 | 5,0 | 0,41 | 4,7 | 15 | 3,1 | 44,1 | 72 |
| 57 | 12,8 | 3,8 | 0,32 | 3,3 | 9,9 | 2,9 | 11,6 | 73 |
| 58 | 18,6 | 5,6 | 0,47 | 2,1 | 10 | 3,1 | 14,0 | 67 |
| 59 | 6,3 | 1,9 | 0,16 | 2,2 | 8,7 | 2,7 | 13,3 | 76 |
| 60 | 12,5 | 3,8 | 0,31 | 2,6 | 11 | 2,7 | 44,5 | 74 |
| 61 | 17,8 | 5,3 | 0,45 | 5,5 | 21 | 3,0 | 44,0 | 70 |
| 62 | 6,0 | 2,4 | 0,20 | 2,1 | 8,7 | 2,55 | 13,6 | 76 |
| 63 | 7,7 | 3,1 | 0,26 | 2,5 | 8,2 | 2,55 | 41,0 | 76 |
| 64 | 5,8 | 2,2 | 0,18 | 3,7 | 15 | 2,55 | 14,4 | 76 |
| 65 | 7,2 | 2,8 | 0,23 | 3,5 | 13 | 2,4 | 50,2 | 76 |
| 66 | 5,6 | 2,3 | 0,19 | 2,9 | 12 | 2,4 | 14,0 | 73 |

AMA = allyl methacrylate
MS = α-methyl styrene

What is claimed is:

1. The process for the preparation of a transparent, high-impact-strength and weather-resistant vinyl chloride polymer by the polymerization of vinyl chloride either together with or without other copolymerizable monomers in aqueous dispersion by the emulsion polymerization method in the presence of at least one acrylic ester copolymers which comprises emulsion polymerizing, at a temperature of 50° to 70°C. and at an absolute pressure of 65 to 95 percent of the saturation pressure of said vinyl chloride or of said monomer mixture at said temperature, vinyl chloride or a monomer mixture containing at least 80 percent by weight of vinyl chloride in the presence of a dispersion of at least one acrylic ester copolymer consisting of 55 to 94.7 percent by weight of at least one acrylic ester containing 3 to 18 carbon atoms in the ester group, 35 to 5 percent by weight of α-methyl styrene and 0.3 to 10 percent by weight of a polyfunctional monomer having at least two non-conjugated ethylenic double bonds, at least one of said double bonds being of the allyl type, said acrylic ester copolymer having a mean particle diameter of 30 to 150 nm, determined by soap titration, and said acrylic ester copolymer being used in a quantity such that the resultant vinyl polymer contains 4 to 20 percent by weight of acrylic ester units.

2. The process according to claim 1 wherein said copolymer has a mean particle diameter of 40 to 120 nm.

3. The process according to claim 1 wherein said acrylic ester copolymer is used in a quantity such that the resultant polymer contains 5 to 10 percent by weight of acrylic ester units.

4. The process according to claim 1 wherein said acrylic ester copolymer consists of 65 to 84.5 percent by weight of at least one acrylic ester having 3 to 18 carbon atoms in the ester group, 30 to 15 percent by weight of α-methyl styrene and 0.5 to 5 percent by weight of a polyfunctional monomer having at least two non-conjugated ethylenic double bonds, at least one of said double bonds being of the allyl type.

5. The process according to claim 1 wherein, in said acrylic acid ester copolymer, the acrylic ester component is at least one acrylic ester having 4 to 8 carbon atoms in the ester group.

6. The process according to claim 1 wherein said acrylic ester copolymer is composed of two different acrylic esters, α-methyl styrene and a polyfunctional allyl monomer.

7. The process according to claim 1 wherein said polymerization is carried out in the presence of at least one polymerization controller, and at least one water-soluble radical-former is used as a catalyst.

8. The process according to claim 1 wherein said polyfunctional allyl monomer is an allyl or methallyl ester of an unsaturated monocarboxylic acid, or an allyl or methallyl mono or diester of an unsaturated dicarboxylic acid, or an allyl or methallyl di-ester, tri-ester or tetra-ester of an aliphatic saturated or aromatic polycarboxylic acid, cyanuric acid and phosphoric acid.

9. The process according to claim 8 wherein said polyfunctional allyl monomer is allyl acrylate or allyl methacrylate.

10. The process according to claim 8 wherein said polyfunctional allyl monomer is tri-allyl cyanuarate.

11. The process according to claim 1 wherein said emulsion polymerization of the vinyl chloride or the monomer mixture is carried out at temperatures from 50° to 70°C.

12. The process according to claim 1 wherein the mixture consists of 80 to 97 percent by weight of vinyl chloride and 20 to 3 percent by weight of at least one α-olefin.

13. The process according to claim 1 wherein the mixture consists of 80 to 97 percent by weight of vinyl chloride and 20 to 3 percent by weight of at least one unsaturated carboxylic acid ester.

14. The process according to claim 1 wherein the monomer mixture consists of 85 to 99 percent by weight of vinyl chloride and 15 to 1 percent by weight of alkyl vinyl ether.

15. The process according to claim 1 wherein said polymerization is carried out in the presence of at least one salt of a fatty acid having 12 to 18 carbon atoms in the molecule as an emulsifier in quantity of from 0.05 to 1 percent by weight based on the vinyl chloride.

16. The process according to claim 1 wherein said polymerization is carried out in the presence of at least one polymerization controller.

17. The process according to claim 1 wherein said polymerization is carried out in the presence of mercaptans, as a polymerization controller, in the quantity of from 0.01 to 0.2 percent by weight based on the vinyl chloride.

18. The process according to claim 1 wherein said polymerization is carried out in the presence of at least one saturated and/or unsaturated halogen hydrocarbon, as a polymerization controller, in the quantity of from 0.1 to 5 percent by weight based on the vinyl chloride.

19. The process according to claim 1 wherein at least one water-soluble radical-former is used as a catalyst.

20. The process according to claim 1 wherein said polymerization is carried out at an absolute pressure equal to 75 to 99 percent of the saturation pressure of the vinyl chloride or of the monomer mixture at the appropriate polymerization temperature and under emulsion polymerization conditions.

21. The product produced by the process of claim 1.

* * * * *